US005960821A

United States Patent [19]

Johnson

[11] Patent Number: 5,960,821

[45] Date of Patent: Oct. 5, 1999

[54] FLOW SENSOR DEVICE AND ASSOCIATED VACUUM HOLDING SYSTEM

[76] Inventor: Edwin Lee Johnson, 211 Hollytree Ct., Ballwin, Mo. 63021

[21] Appl. No.: 08/844,260

[22] Filed: Apr. 18, 1997

Related U.S. Application Data

[60] Provisional application No. 60/029,995, Nov. 12, 1996.

[51] Int. Cl.$^{6}$ .................. F16K 17/00

[52] U.S. Cl. .................. 137/460; 137/462; 137/517; 248/362; 251/63.6; 251/28

[58] Field of Search .................. 137/517, 460, 137/462, 456, 907, 533.11; 251/63.6, 28; 248/363, 362

[56] References Cited

U.S. PATENT DOCUMENTS

| | | | |
|---|---|---|---|
| 337,236 | 3/1886 | Briscoe | 137/517 |
| 854,047 | 5/1907 | Leber | 137/462 |
| 1,491,241 | 4/1924 | Kindervater | 137/460 |
| 2,541,282 | 2/1951 | Powers | 137/517 X |
| 2,910,265 | 10/1959 | Anander | 248/363 |
| 2,929,399 | 3/1960 | Magowan | 137/517 X |
| 3,236,488 | 2/1966 | Wilson . | |
| 3,468,338 | 9/1969 | Patterson | 137/517 |
| 3,561,471 | 2/1971 | Sands | 137/498 |
| 3,602,543 | 8/1971 | Sjodin . | |
| 3,905,408 | 9/1975 | Hale . | |
| 4,221,356 | 9/1980 | Fortune | 248/363 |
| 4,249,566 | 2/1981 | Deane | 137/498 |
| 4,421,292 | 12/1983 | Matsui et al. | 251/63.6 X |
| 4,539,959 | 9/1985 | Williams | 137/498 X |
| 4,650,233 | 3/1987 | Mang et al. . | |
| 4,718,629 | 1/1988 | Block et al. . | |
| 4,830,046 | 5/1989 | Holt | 137/460 |
| 5,374,021 | 12/1994 | Kleinman . | |
| 5,441,202 | 8/1995 | Wintering et al. | 137/517 X |
| 5,772,170 | 6/1998 | Tsukushi | 248/363 |

*Primary Examiner*—Denise L. Ferensic
*Assistant Examiner*—Ramyar Farid
*Attorney, Agent, or Firm*—Haverstock, Garrett & Roberts

[57] ABSTRACT

A flow sensor device includes a main passage having a normally open shut off valve therein which is configured to shut off at a predetermined rate of air flow therethrough. The shut off valve includes a seating structure and a centering structure positioned within the main passage, a sealing member being positioned between the seating structure and centering structure. The sealing member is biased toward the centering structure by a resilient member. Air flow through the main passage exerts a force on the sealing member which pushes the sealing member toward the seating structure. When the force caused by the air flow exceeds the opposing force of the resilient member, the sealing member contacts the seating structure in a sealing relationship such that air flow through the main passage is substantially eliminated. The flow sensor device may also include a controllable release valve and/or a controllable reset valve, enabling control of the shut off valve of the main passage. Further, an air pulse distribution device is also provided for controlling the reset valves and/or release valves of a plurality of flow sensor devices.

13 Claims, 12 Drawing Sheets

FLOW SENSOR DEVICE AND ASSOCIATED VACUUM HOLDING SYSTEM

This Application claims the benefit of U.S. Provisional Application No. 60/029,995, filed Nov. 12, 1996.

FIELD OF THE INVENTION

This invention relates generally to air flow sensors and more particularly, to a flow sensor device configured for use in vacuum holding systems, which flow sensor device includes a main flow passage with a shut off valve positioned therein such that air flow through such main passage automatically shuts off at a predetermined rate, and which may include a release valve and/or reset valve associated therewith.

BACKGROUND OF THE INVENTION

In vacuum holding systems, a vacuum source is connected to a plurality of vacuum cups which are configured to engage a workpiece or other object, or a plurality of workpieces or other objects. When the vacuum source is in operation, the difference in pressure between the vacuum source and each of the vacuum cups results in a tendency for air to be drawn into each of the vacuum cups. If a given vacuum cup is engaged with a workpiece or object, a suction force is created between the object and the cup. Typically, the suction force of a plurality of such cups is utilized to lift and hold a particular object or plurality of objects. Such systems are commonly utilized, for example, in vacuum pick up and place systems used in pallet loading and unloading, where various layers of product, such as soft drinks packaged in various quantities, are placed on and removed from pallets.

In such vacuum holding or pick up and place systems, one problem commonly encountered is that of excessive leakage flow. For example, if one or more of the vacuum cups does not engage the product in a sealed fashion, some amount of leakage flow through the vacuum cup to the vacuum source will occur. Because the typical vacuum source is only capable of creating a certain maximum air flow in the overall system, any such leakage flow reduces the effective suction force of the vacuum cups which engage the product. Thus, the effective holding capacity of the plurality of vacuum cups is diminished. In some cases, where the leakage flow is too great, the vacuum holding system may be rendered ineffective.

In the past, various devices to limit flow losses in vacuum cup holding, or pick and place, systems have been utilized with varying success. For example, orifices to limit flow at each cup to a known value have been utilized. The problem with this approach is that an orifice will pass an increasingly higher flow rate as the pressure differential across it is increased, so, as the system vacuum level increases, the orifice leakage also increases.

In the past, a leaky check valve has also been utilized which would close immediately whenever flow occurred but would still leak enough that it could reopen when the vacuum cup was pressed into sealing contact with a work piece or product. Such leaky check valves presented the same problems as the aforementioned flow limiting orifice, although this approach did initially limit flow losses when vacuum was first applied to the system. However, other problems arose. For example, when using larger vacuum cups, reopening the check valve via leakage flow took too long when picking up a part or product and caused lower productivity due to increased cycle times. Further, the small leakage flow of such fixed-value check valves was also sometimes insufficient to make up for porosity flow passing through a porous work surface and the part or product could not be picked up because the check valve would remain closed. If the check valve leakage rate was increased in response to such problems, such configurations lead back to the excess leakage flow problems associated with larger orifices because inactive vacuum cups leaked continuously through the "closed" leaky check valves, which made larger vacuum pumps necessary, increasing the cost of such systems.

Other devices such as mechanically operated valves have been incorporated into vacuum cup fittings. Such normally closed valves are opened only when a valve stem associated therewith is pressed into contact with a work surface or product surface. Problems with this approach include that work surfaces can be marred by the valve stems and high forces are required to press numerous valves into contact with the work surface or product surface. Further, due to damaged work surfaces, cracks between products, or vacuum cups overhanging the work piece or product edge, some vacuum cups do not effectively seal even when the mechanical valve is actuated, again resulting in undesired leakage flow.

Accordingly, it is desirable and advantageous to provide a flow sensor valve which could be utilized in such vacuum holding systems for preventing excessive leakage flow if, for any reason, substantially sealing contact is not made between the vacuum cup and the work piece or product which is to be handled. It also is desirable and advantageous to provide a flow sensor valve which is adjustable to provide shut-off at predetermined flow rates.

An object of the present invention is to provide a valve construction for a main air flow passage where air flow through such main passage which exceeds a predetermined rate results in shut off of the main passage with negligible leakage flow.

Another object of the present invention is to provide a valve construction for a main air flow passage which valve can be adjusted or tuned such that the shut off point thereof is selectable for various desired applications.

Yet another object of the present invention is to provide a flow sensor valve having a main passage with a shut off valve therein, and a controllable release valve which enables the main passage to be shut off even when the vacuum cup associated therewith is in sealing contact with a work piece or product.

A further object of the present invention is to provide a flow sensor valve having a main passage with a shut off valve therein, and a controllable reset valve which enables the shut off valve of the main passage to be opened without requiring the vacuum source associated therewith to be turned off.

Another object of the present invention is to provide an air pulse distribution system for controlling the operation of release valves and/or reset valves associated with a plurality of flow sensor valves in a vacuum pick and place device.

SUMMARY OF THE INVENTION

In one embodiment, the present invention includes a valve body with a main flow passage or bore extending therethrough, where one end, the upstream end, of the main passage is to be associated with a vacuum cup while the other end, the downstream end, of the main passage is to be associated with a vacuum source. A poppet type shut off valve is positioned within the main passage and includes a movable sealing member, a resilient member, and a seat portion, the sealing member positioned upstream of the seat portion and configured such that when it engages the seat portion, sealing contact is made therebetween to prevent air flow through the main passage. The resilient member engages the sealing member such that, when no vacuum is applied, the sealing member is not in sealing contact with the seat portion, and the upstream and downstream ends of the main passage are in flow communication. When a vacuum is applied to the downstream end of the main passage, air flowing therethrough creates a force on the sealing member in the same direction as the air flow and in proportion to the air flow rate. The resilient member bears on the sealing member with a force which opposes the force caused by the air flow. When the air flow rate reaches a sufficient level, the force exerted on the sealing member becomes sufficient to overcome the force exerted by the resilient member, compressing the resilient member such that the sealing member engages the seat portion and makes sealing contact therewith. Preferably, the distance between the sealing member and the seat portion is adjustable, as is the force exerted against the sealing member by the resilient member. By adjusting these two variables, independently or simultaneously, the shut off valve can be set to close or shut off at a specific, predetermined flow rate.

The shut off valve described above will automatically reset whenever the vacuum source is momentarily turned off. Air flow may also be momentarily reversed, via other pneumatic components, to provide a cleaning action for a filter which may be positioned in the region of the air entry end of the main passage. The shut off valve may be utilized for either vacuum systems or for other pneumatic systems as long as air flow is in the correct direction and the working pressure parameters are factored into arriving at the required flow rate setpoint which effects shut off. A simple release port positioned at the upstream side of the sealing member may also be provided. By controllably connecting the release port to atmosphere, or a pressurized air source, through an externally controlled valve for example, the sealing member can be controllably placed in the shut off position in sealing contact with the seat portion, and a part that is held by the vacuum cup associated therewith will be released. Such a simple release port is preferably located integral with the valve body, although it could be located anywhere upstream of the sealing member.

In a further embodiment of the invention the valve body includes a solenoid or air pilot operated release valve including a release flow path from the upstream end of the sealing member to ambient atmosphere. Such a release flow path is normally closed and is opened by providing an external electrical signal to a solenoid, or a pressurized air signal to a piston type member, to momentarily open the release flow path. Upon cessation of the external signal, the release flow path again closes off such that no leakage flow occurs.

Similarly, in another embodiment of the invention the valve body includes a solenoid or air pilot operated reset valve including an alternative or bypass flow path from the upstream end of the sealing member to the downstream end of the seat portion. This bypass flow path is normally closed and can be momentarily opened via an external electrical signal or air signal. When the sealing member of the main passage shut off valve is in sealing contact with the seat portion, such external signal operates to momentarily equalize the pressure at the upstream and downstream sides of the sealing member such that the sealing member is released from its seated position. Thus, the main passage shut off valve can be reset without requiring the vacuum source to be turned off, and the main passage shut off valve can be reset when the vacuum cup associated with the main passage is in sealing contact with a work piece or product.

A flow sensor valve in accordance with the present invention may also be provided with both a release valve and a reset valve, providing full remote control capability without turning the vacuum source on and off Such a configuration is particularly advantageous in vacuum pick up and place systems which may be utilized in the loading and unloading of pallets having mixed product loads because it allows particular products to be picked up and/or released while other products are simultaneously maintained in a held position.

In this regard, an air pulse distribution system for controlling the operation of the air pilot operated reset valve and/or release valve of a plurality of flow sensor devices of a vacuum pick up and place device is provided. In such system pressurized air from a single source is controllably distributed through solenoid operated valves to a distribution device including passages which are movable with respect to a plurality of distribution ports thereof, which ports are in flow communication with the reset and release valves to be controlled. A motor is operable to move the distributor arms relative to the distribution ports, such movement being controlled by a computer system associated therewith. The computer system also controls operation of the solenoid operated valves. The computer system is therefore capable of controlling all reset valves and release valves within a system by controlling both the position of the passages relative to the distribution ports and the operation of the solenoid valves.

DETAILED DESCRIPTION OF THE DRAWINGS

Figure 1:
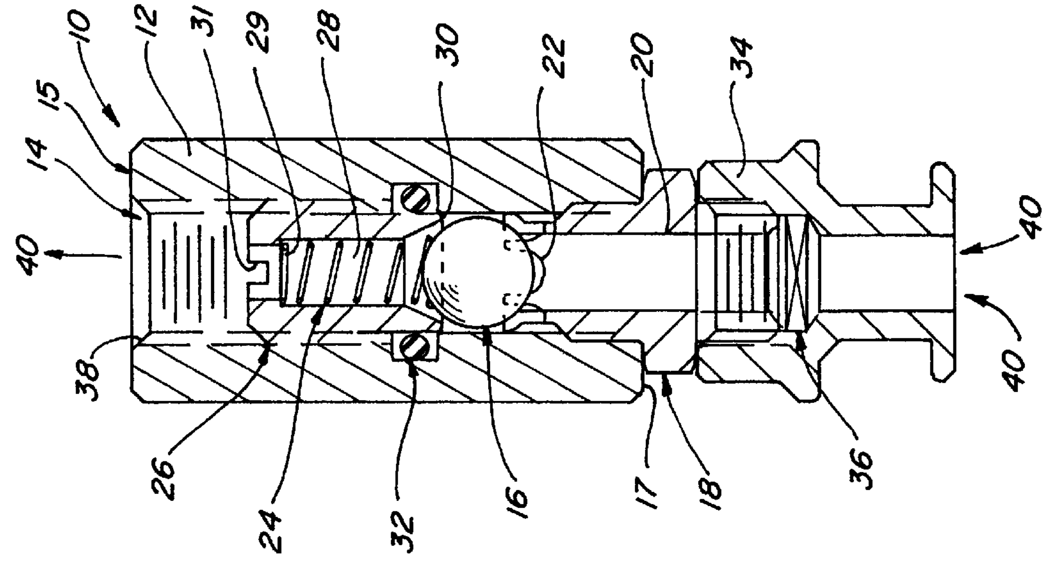
FIG. 1 is a cross-sectional view of a flow sensor device including a shut off valve constructed in accordance with one embodiment of the present invention, one end thereof being connected to a coupling member.
Figure 1A:
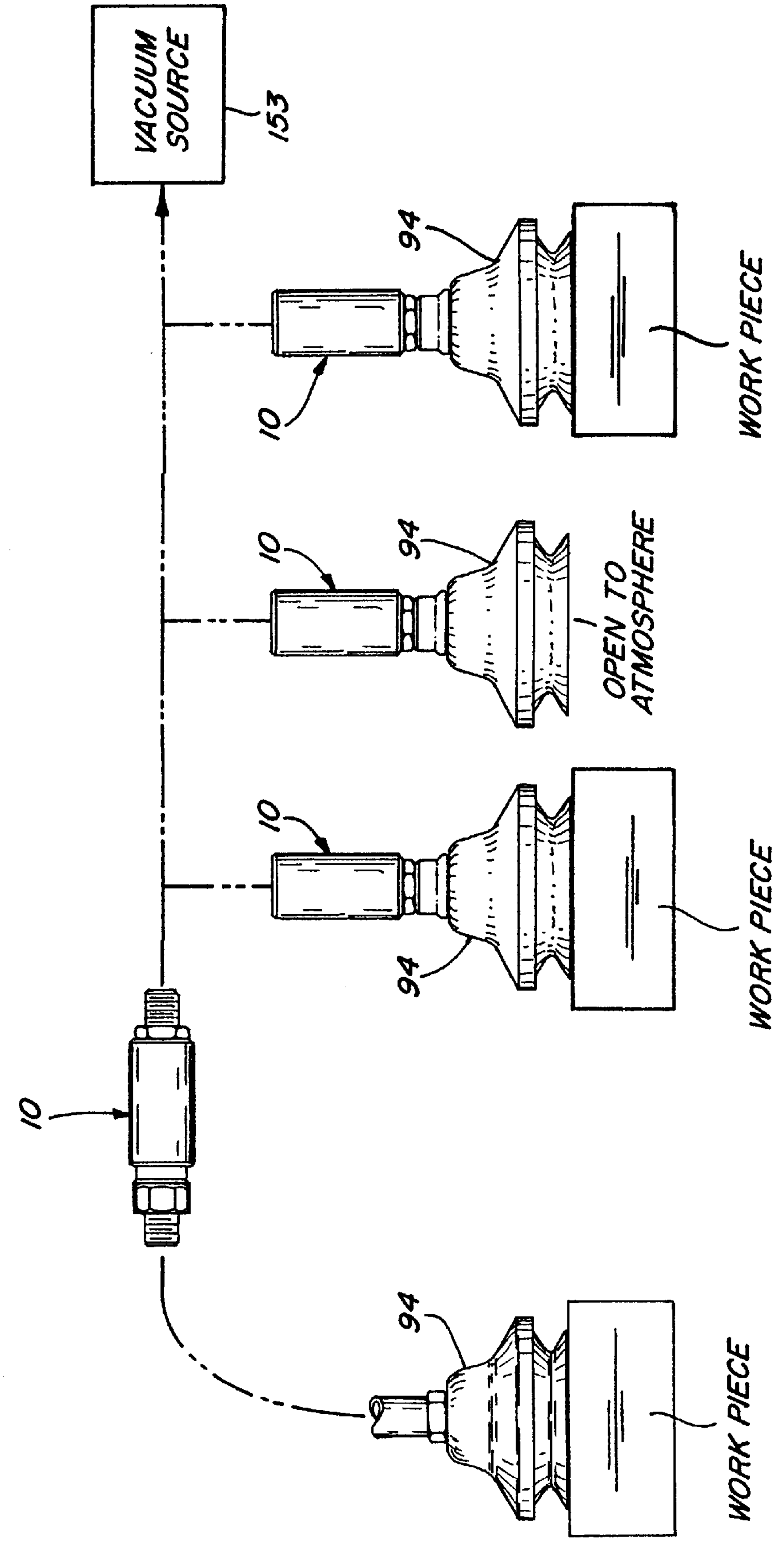

As seen in FIG. 1, a flow sensor device 10 includes a body portion 12 having a main passage or bore 14 therethrough. When installed, a downstream end 15 of body portion 12 is connected to a vacuum source and an upstream end 17 of body portion 12 is associated with a vacuum cup. A shut off valve is positioned within main passage 14 and includes a sealing member 16, which may take the form of a ball as shown, and may be formed of plastic. An upstream side of the ball 16 engages a centering member 18 which, in this case, is threadedly engaged with the upstream end of main passage 14. The centering member 18 includes a passage 20 therethrough and a recessed, non-contacting portion 22 which allows air to flow around the ball 16. The downstream side of ball 16 contacts a spring 24 or other resilient member, which spring 24 also contacts a seating element 26. The seating element 26 includes a passage 28 therethrough, the downstream end of the passage having a surface 29 which engages one end of the spring 24. An upstream end 30 of the seating element 26 is configured to make sealing contact with the ball 16, and may include a frusto-conical seating surface for such purpose. The seating element 26 is threadedly engaged within the main passage 14 and includes a notched portion 31 configured for receiving a screwdriver or alien wrench which may be utilized to turn the seating element 26. A seal 32, such as an o-ring, may also be provided in an annular groove of the body 12 within the main passage 14. The centering member 18 is connected, by way of threaded engagement for example, to a coupling member 34 which is configured for connection to a vacuum cup (not shown). A filter member 36 may also be provided between the centering member 18 and the coupling member 34.

In operation a vacuum source associated with the downstream end 38 of the main passage 14 will cause air to flow in the direction indicated by arrows 40. Within the main passage 14, as air flows around the ball 16 and between the ball 16 and the end 30 of the seating element 26, a pressure differential thereacross causes a resultant force which pushes the ball 16 against the spring 24 with a force which increases as the air flow rate increases. When the force created by the pressure differential exceeds the opposing force of the spring 24, the ball 16 contacts the end 30 of the seating element 26 and a sealing contact is formed therebetween preventing further air flow through the main passage 14. Importantly, by adjusting the position of the seating element within the passage, and/or by adjusting the force exerted by the spring 24, air flow through the main passage 14 can be set to shut off at a predetermined air flow rate. With respect to end 30 of seating element 26, it is preferred that ball 16 contact the seat portion over a large area to maximize the effective area upon which the differential pressure works in order to assure that the ball 16 remains seated.

Figure 2:
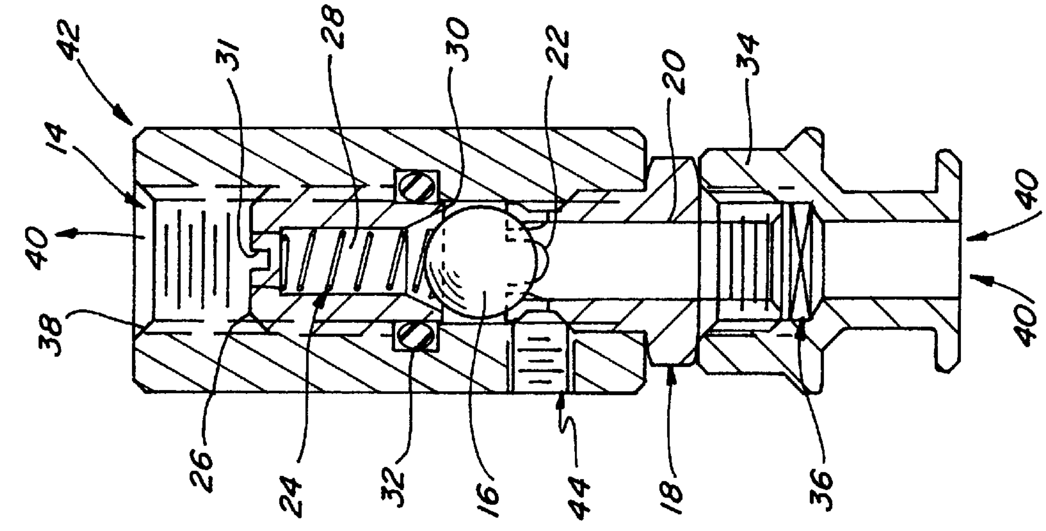
FIG. 2 is a cross-sectional view of a flow sensor device including a shut off valve constructed in accordance with FIG. 1, including a simple release port associated therewith.

A similar flow sensor device 42 to that of FIG. 1 is illustrated in FIG. 2, and also includes a simple release port 44 located at the upstream side of the ball 16. If release port 44 is opened to ambient air, or a pressurized air source, flow through the main passage 14 will shut off even if a vacuum cup associated with the upstream end thereof is in sealing contact with a work piece or product. Thus, release port 44, which may be threaded, can be connected to a control line for such purpose.

Figure 3:
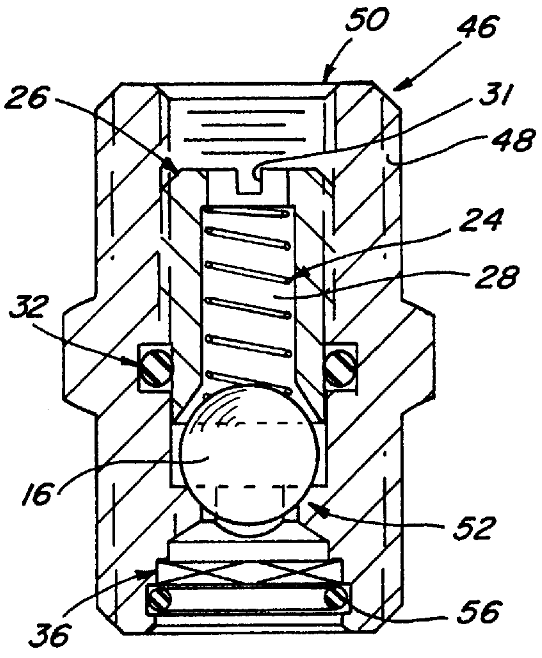
FIG. 3 is cross-sectional view of an alternative embodiment of a shut off valve of the present invention.
Figure 4:
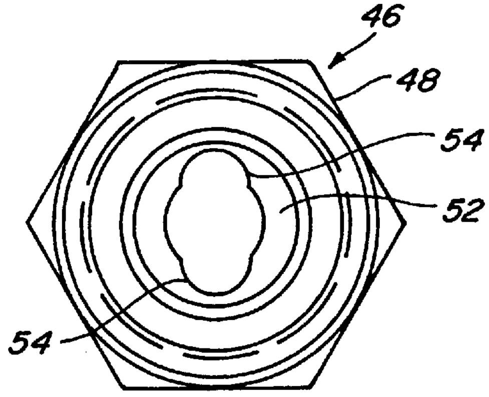
FIG. 4 is an upstream end view of the device of FIG. 3.

FIG. 3 illustrates an alternative embodiment of a flow sensor device 46 including a body 48 having a main passage or bore 50 therethrough and including seating element 26, spring 24 and ball 16 positioned therewithin. The upstream end of ball 16 contacts centering structure 52 which, in this case, is formed integral with the body 48. The upstream end view of FIG. 4 illustrates that the centering structure 52 includes regions 54 which allow air to flow around the ball 16. Referring again to FIG. 3, a filter member 36 is positioned within the body 48 and may be held in place by an o-ring 56. The flow sensor device 46 operates generally as described above with respect to flow sensor valve 10. As best demonstrated in FIG. 3, it is not critical to the present invention that the position of both the seating element and the centering element be adjustable along the length of the main passage. Rather, as long as the position of one of the elements is adjustable, the flow shut off rate of the main passage will be adjustable.

Figure 5:
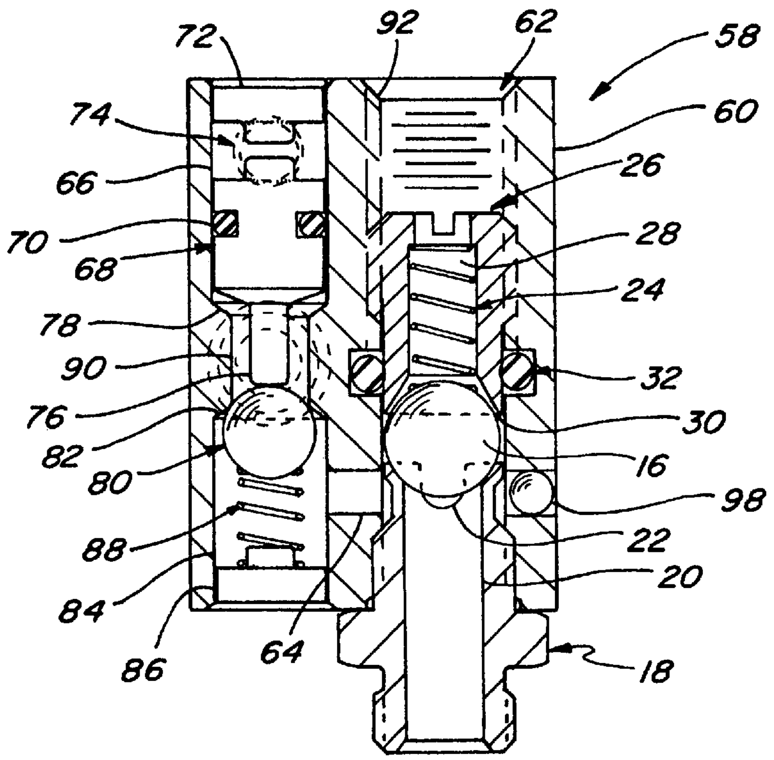
FIG. 5 is a cross-sectional view of a flow sensor device having an air pilot controlled release valve associated with the main flow passage thereof.

FIG. 5 illustrates a flow sensor device 58 including a body 60 having a main passage or bore 62 therethrough. Positioned within the main passage 62 are ball 16, spring 24, seating element 26, and centering member 18. An air pilot operated bleed valve or release valve is also associated with the upstream end of the main passage 62 by way of one or more passages 64. The release valve includes a first bore 66 having a piston member 68, which may be formed of plastic, positioned therein in sealing contact with the inner surface of the bore 66, which sealing contact may be achieved through use of an o-ring seal 70 positioned in an annular groove of the piston member 68. The bore 66 is sealed at the outer end by way of a cap member 72 which may be secured in position using a sealing adhesive. The region between cap member 72 and piston member 68 is connectable to a pressurized air source by way of a threaded opening 74, which in this view is shown in shadow. The piston member 68 includes a nose portion 76 which passes through an opening 78 at the internal end of the bore 66 and contacts a poppet member or sealing member 80, in this case a ball. The ball member 80 is in normally sealing contact with a seat 82 formed at an internal end of a second bore 84. The bore 84 is also sealed at its outer end by a cap member 86. A spring 88 or other resilient member is positioned between the cap 86 and the ball 80 to urge the ball into normally sealing contact with seat 82. Thus, passage 64 which leads to bore 84 is normally closed to ambient air. However, if a momentary burst of pressurized air is supplied via opening 74 to the first bore 66, the pressurized air causes piston 68 to move inward, and to push ball 80 momentarily out of sealing contact with seat 82. An opening 90, shown in shadow, is provided through the body 60 such that when the seal between ball 80 and seat 82 is broken, a release flow path between ambient air and the passage 64 is created.

Figure 6:
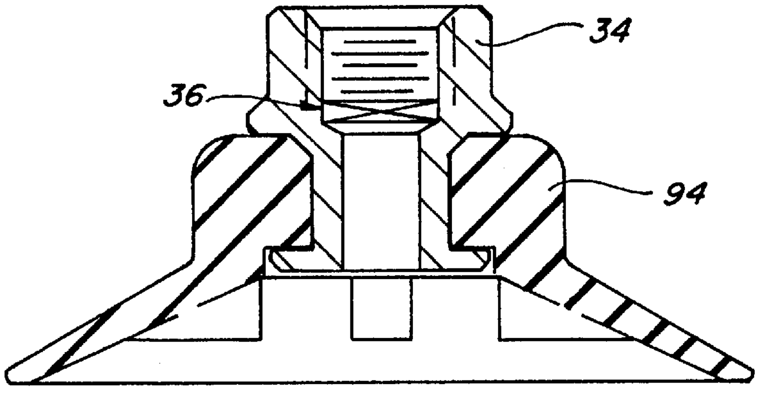
FIG. 6 is a cross-sectional view of a coupling member and a vacuum cup.

In operation, the main passage 62 is operatively connected to a vacuum source at downstream end 92 and to a vacuum cup 94, shown in FIG. 6, at its upstream end by way of connection between coupling member 34 and centering member 18. If a product or work piece (not shown) is in sealing contact with vacuum cup 94, the product will be held in place by the vacuum forces created. By providing a momentary burst of pressurized air to opening 74, ball 80 is moved out of sealing contact with seat 82 and a release flow path between opening 90 and passage 64 is created, allowing sufficient air to bleed into the main passage 62 at the upstream side of ball 16, causing the ball 16 to contact the end 30 of the seating element 26. At that point in time the upstream end of main passage 62 is closed off to the vacuum source and any product in contact with a vacuum cup 94 associated therewith is released. When the pressurized air burst to opening 74 is removed or subsides, piston 68 withdraws and sealing contact is again made between ball 80 and seat 82. Accordingly, flow sensor device 58 provides a construction which allows a product to be released from a vacuum cup 94 without requiring the vacuum source to be shut off. Further, in a system including a plurality of vacuum cups 94 and associated valves 58, shut off of flow communication between the upstream end of each main passage 62 and the vacuum source associated with the downstream end thereof may be selectively controlled by bursts of pressurized air to the respective openings 74.

Figure 7:
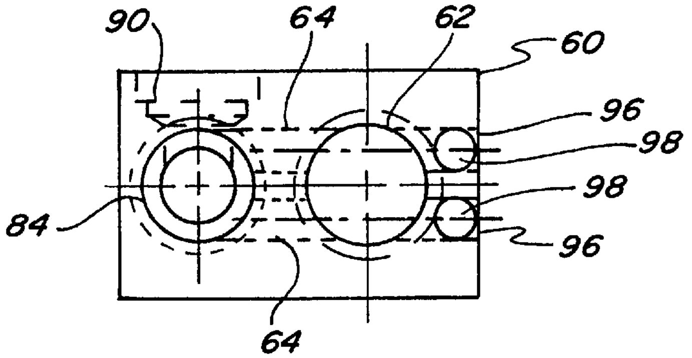
FIG. 7 is a downstream end view of the device of FIG. 5.

The downstream end view of FIG. 7 illustrates that the one or more passages 64, shown in shadow, may be formed by bores 96, the ends of which include a plug type seal 98. Opening 90 is also shown in shadow.

Figure 8:
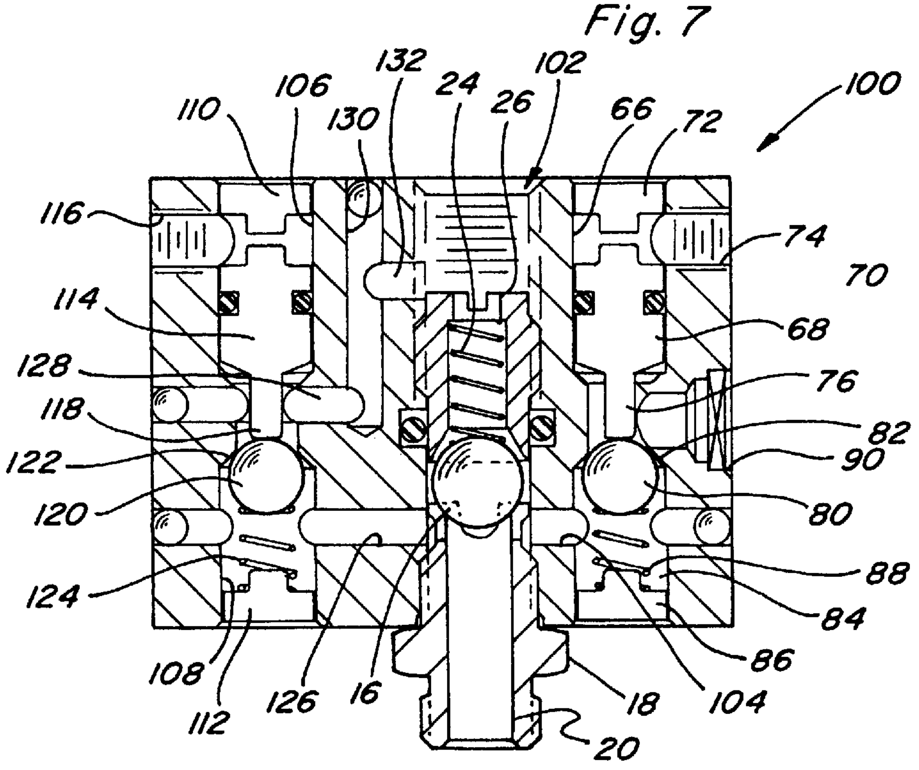
FIG. 8 is a cross-sectional view of a flow sensor device having both an air pilot controlled release valve and an air pilot controlled reset valve associated with the main flow passage thereof.

A further embodiment of a flow sensor device 100 is illustrated in FIG. 8. The device 100 includes a main passage 102 with a seating element 26, spring 24, ball 16, and centering member 18 positioned therein. The right side of FIG. 8 depicts an air pilot operated release valve substantially as described with reference to FIGS. 5–7. In particular, a first bore 66 includes end cap 72 and a piston member 68 positioned therein. A nose portion 76 of piston member 68 contacts a ball 80. Ball 80 is positioned within a second bore 84 and is normally biased against seat 82 by spring 88. An opening 74 is provided for supplying pressurized air bursts to bore 66, and opening 90 is provided for a release flow path from main passage 102, through passage 104, through opening 90 to ambient air. Operation of the release valve is as previously described above.

Flow sensor device 100 also includes an air pilot operated reset valve which is similar in construction to the release valve, but provides for controllable opening of a bypass flow path from the main passage 102 at the upstream side of ball 16, to the main passage 102 at the downstream side of the seating element 26. The reset valve includes a first bore 106 and second bore 108, each sealed at the end with respective cap member 110, 112. A piston member 114 is positioned in first bore 106. The bore 106 is connectable to a controllable pressurized air source via threaded opening 116. A nose portion 118 of the piston member contacts ball 120 which is in a normally sealed contacting arrangement with respect to a seat 122 due to bias thereagainst provided by a spring 124 which is positioned between the ball 120 and cap member 112. Bore 108 is in flow communication with the main passage 102 at the upstream side of ball 16 by way of one or more passages 126 extending therebetween. When ball 120 is moved from its seated position by a burst of pressurized air provided to opening 116, bore 108 is in flow communication with a passage 128, which in turn is in flow communication with a passage 130, which in turn is in flow communication with a passage 132 which leads to main passage 102 at the downstream side of seating element 26. Accordingly, a bypass flow path is provided from the upstream side of ball 16, through passage 126, to bore 108, to passage 128, to passage 130, to passage 132 and to the downstream side of main passage 102. In operation, if the main passage 102 is in shut off mode, meaning ball 16 is seated against the seating element 26, and if the upstream end thereof is associated with a vacuum cup 94 (FIG. 6) which is in sealing contact with a work piece or product, flow through the main passage 102 may be reset by providing a momentary burst of pressurized air at opening 116 which moves piston 114 and thereby moves ball 120 out of sealing contact with seat 122, momentarily opening the bypass flow path. When the bypass flow path is opened, the pressure across the upstream and downstream sides of the ball 16 will tend to equalize, such that the force exerted by spring 24 causes the ball 16 to release from its sealing contact with seating element 26, thereby resetting or opening the main passage 102. Accordingly, a flow sensor device 100 in accordance with FIGS. 8 may be independently controlled via both the air pilot operated release valve and the air pilot operated reset valve.

Figure 9:
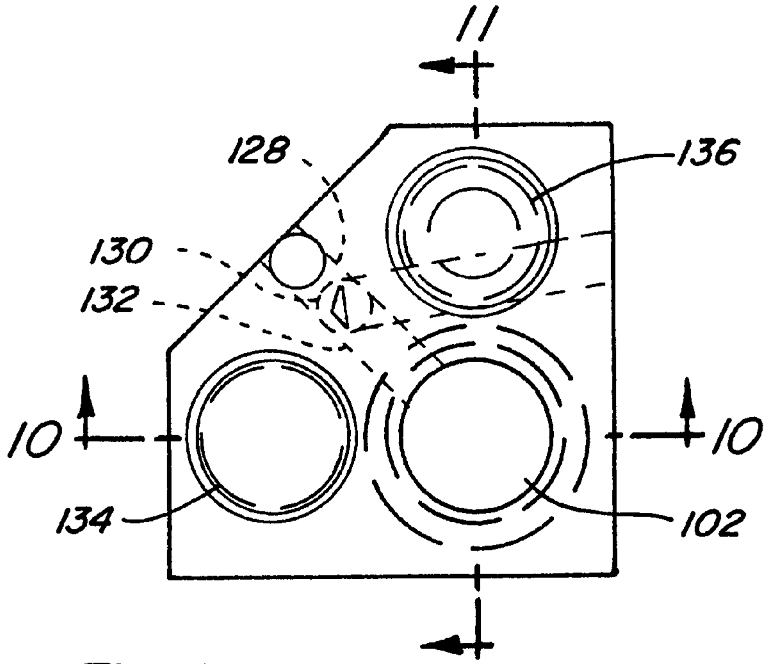
FIG. 9 is a downstream end view of another configuration of a flow sensor device having both an air pilot controlled reset valve and an air pilot controlled release valve associated with the main flow passage thereof.
Figure 10:
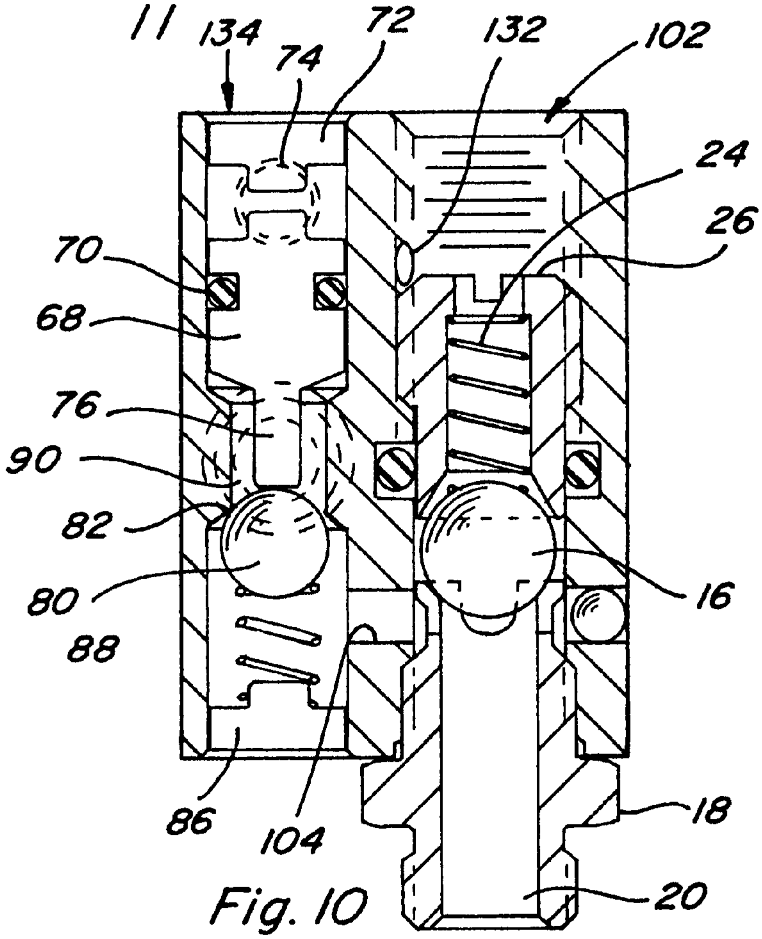
FIG. 10 is a cross-sectional view along line 10—10 of FIG. 9.
Figure 11:
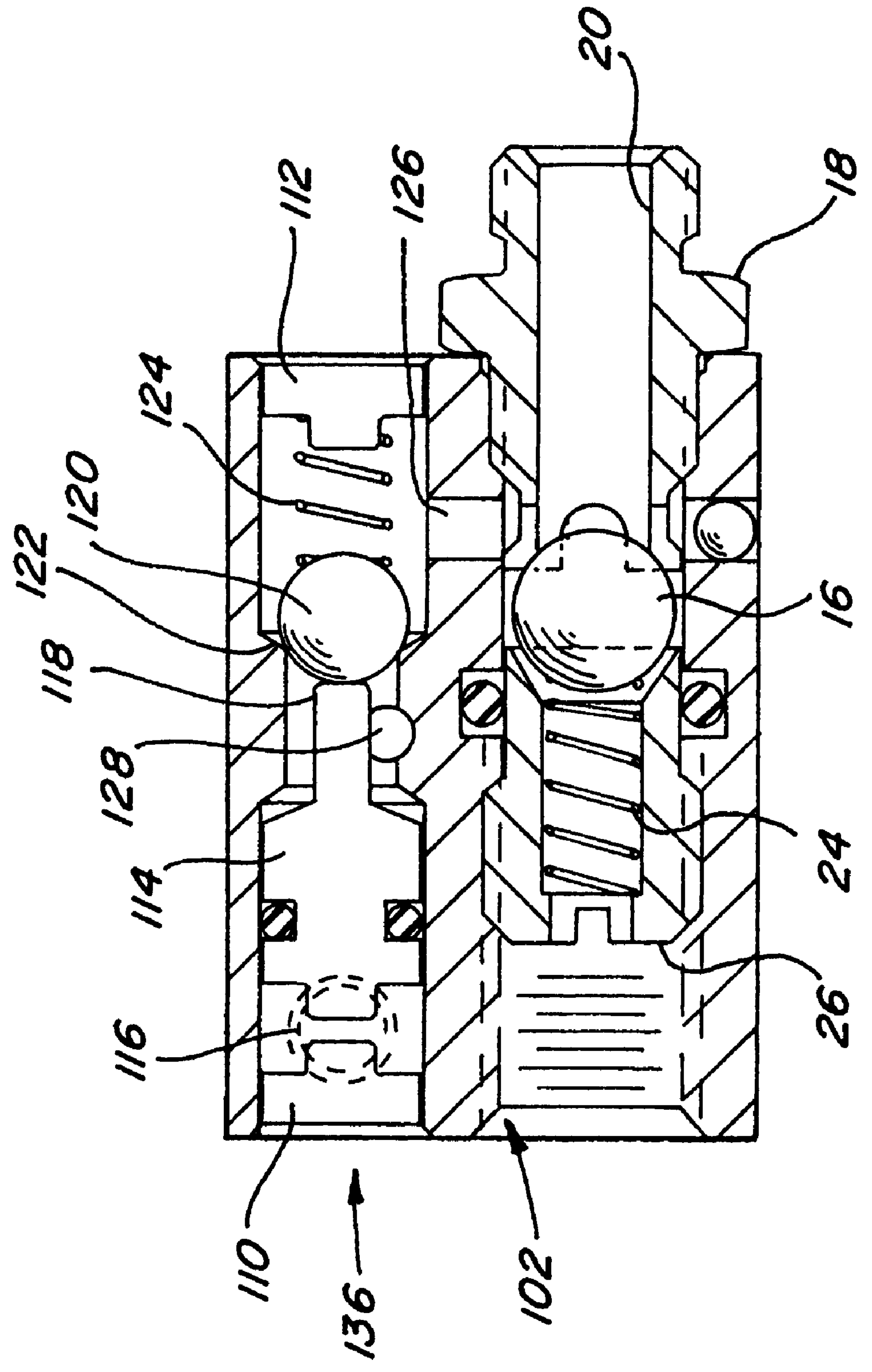
FIG. 11 is a cross-sectional view along line 11—11 of FIG. 9.

FIG. 9 depicts an end view of another configuration of a flow sensor device including both a reset valve and a release valve. Although FIG. 8 depicts the main passage, reset valve, and release valve in a side-by side relationship, it may be preferred to utilize an orientation as depicted in FIG. 9. In such orientation, the release valve 134 is positioned to the left of main passage 102, while the reset valve 136 is positioned above the main passage 102. Passages 132, 130, and 128 of the bypass flow path are also depicted in shadow. This orientation may be utilized in order to provide a more compact overall assembly. FIGS. 10 and 11 depict cross-sectional views along lines 10—10 and 11—11 of FIG. 9 respectively.

In general, and with respect to the various flow sensor devices described above, in vacuum applications such flow sensor devices are installed between the vacuum holding device, typically a vacuum cup, and the vacuum source in material handling and vacuum pick up and place systems. When using an array of vacuum cups, the vacuum cups in sealing contact with a part to be held will not allow sufficient air flow through the main passage to seat the ball therein, while the vacuum cups open to atmosphere will allow a higher volume of air to flow through the main passage, causing the ball therein to seat, shutting off such main passage. Because flow losses are minimized by closing off inactive cups, a higher vacuum level can be applied to the active cups in the system making it more efficient at holding parts securely.

The flow rate setpoint for the main passage of a given flow sensor device is best determined by first testing the porosity of a sample workpiece with a flowmeter using the same vacuum cup size and style as will be used in the system and at the system vacuum level. Similarly, textured, or rough, surfaces of non-porous materials would be tested to determine what “normal” leakage could be expected between a vacuum cup and an imperfect work surface. A factor of safety should be added to this test value to allow for variations in workpiece porosity, system vacuum level, increased leakage due to cup wear and other factors. For porous work pieces such as paper and cardboard, the factor of safety could be in a range from approximately 25 to 50 percent. For non-porous workpieces such as smooth plastic or metal, the factor of safety could be reduced.

In typical vacuum pick up and place systems, a plurality of vacuum cups are utilized, and each would be associated with the main passage of a flow sensor device according to the present invention. With particular reference to the flow sensor device 100 illustrated in FIG. 8, or the embodiment depicted in FIGS. 9–11, a system including such flow sensor devices 100 can be computer-controlled such that the operation of each vacuum cup is independently controlled. In such a system, multiple work pieces or products could be independently picked up and released in a fashion which would allow some products to be held while others are released, as well as while others are simultaneously picked up. Such a system would be particularly advantageous in an operation where multiple product pallet loads are encountered.

Figure 12:
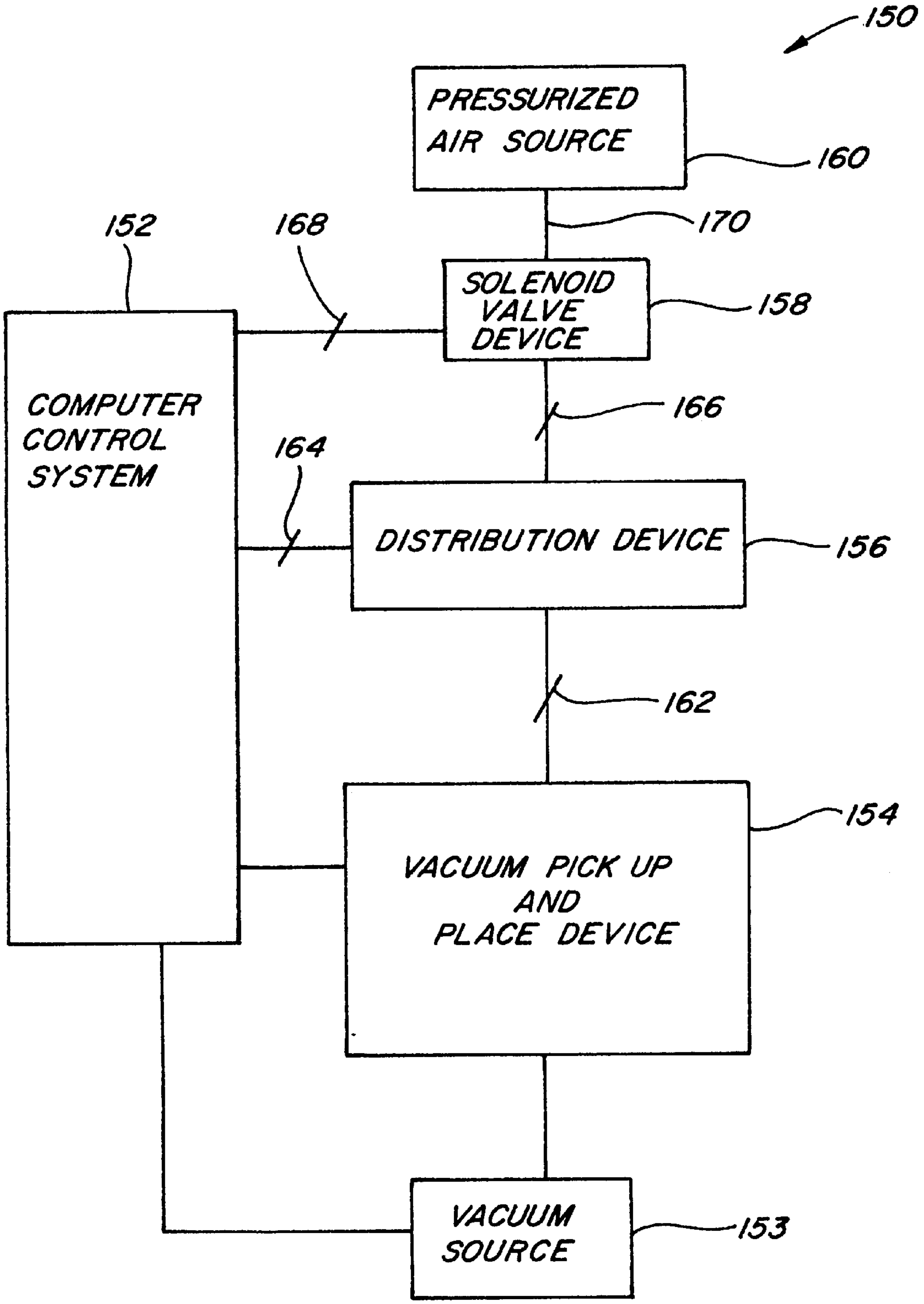
FIG. 12 is a block diagram illustration of a vacuum pick up and place system.

Referring to FIG. 12, a block diagram illustration of a computer controlled vacuum pick up and place system 150 is provided, including a computer control system 152, a vacuum source 153, a vacuum pick up and place device 154, an air distribution device 156, a solenoid operated air valve device 158, and a pressurized air source 160. Vacuum pick up and place device 154 would typically include a plurality of vacuum cups arranged in an array, each connected in flow communication with vacuum source 153. In the system 150, each vacuum cup is connected to the vacuum source through a flow sensor device including a main passage shut off valve and a reset valve and/or a release valve such as depicted in FIG. 8. Thus, the system 150 is intended to provide at least some control of each of the vacuum cups of the vacuum pick up and place device 154, more control being achieved when the flow sensor devices utilized include both a reset valve and a release valve. Assuming the flow sensor devices utilized include both a reset valve and a release valve, each flow sensor device of vacuum pick up and place device 154 includes flexible air tubing extending from the reset valve thereof to distribution device 156, and flexible tubing extending from the release valve thereof to distribution device 156. Such flexible tubing is represented generally by connection 162. Vacuum pick up and place device 154 is also connected to computer control system 152 for controlling movement thereof The distribution device 156 is connected to computer control system 152 via lines 164 for control thereby, and is also connected to valve device 158 by one or more flexible air tubes represented by 166. In this regard, solenoid operated air valve device 158 could include a single inlet and a singlet outlet, one solenoid operated valve positioned therebetween, or such device could include a plurality of outlets and a corresponding plurality of solenoid operated vlaves. Assuming a system in which device 158 includes a plurality of outlets and a corresponding plurality of solenoid operated valves, the solenoid valve device 158 is connected to computer control system 152 via a plurality of lines 168 for control thereby, and is also connected to pressurized air source 160 by air hose, or tubing, 170.

Figure 13:
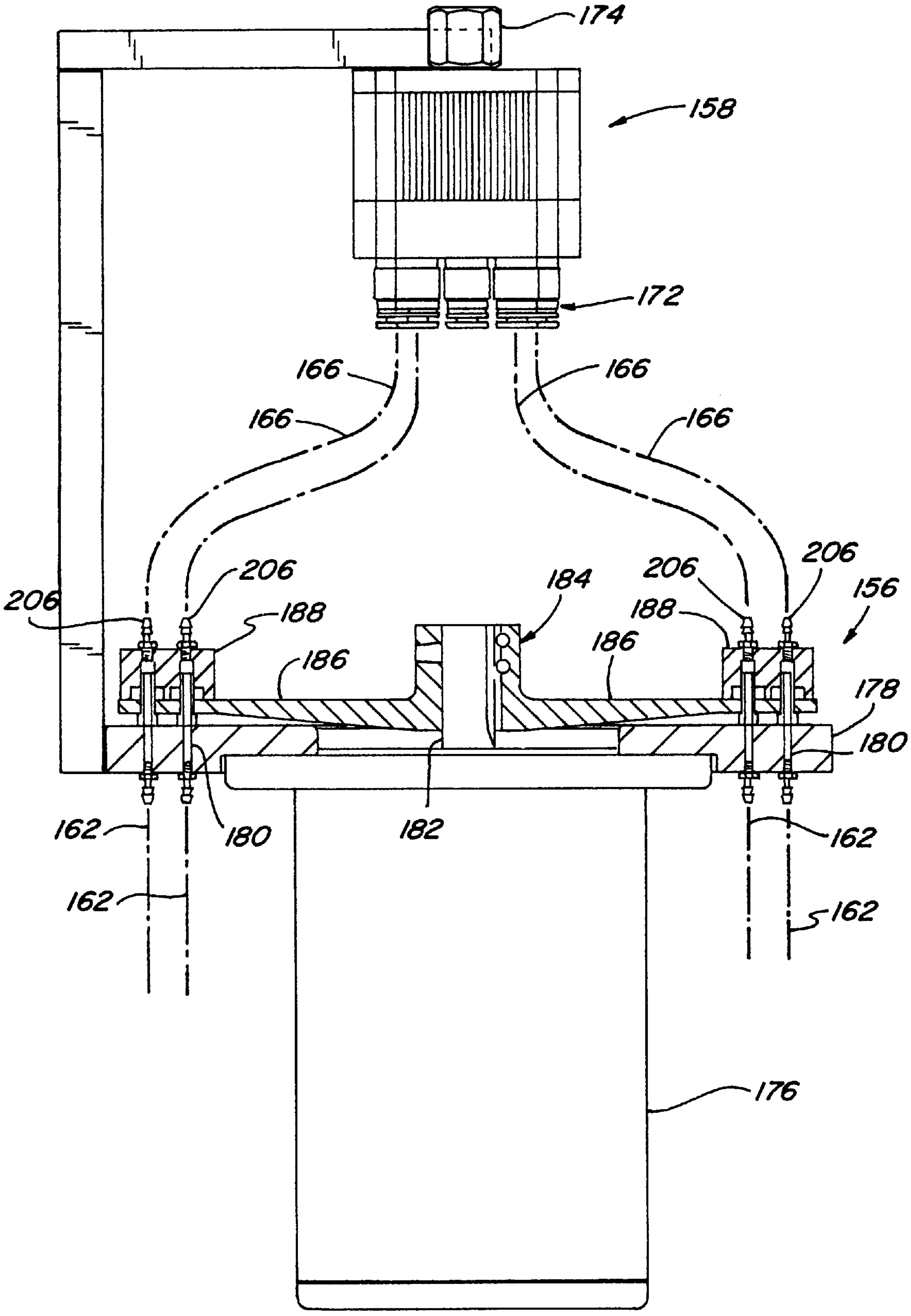
FIG. 13 is a partial cross-sectional view of one embodiment of a distribution device associated with a single inlet - multiple outlet solenoid operated valve device.
Figure 14:
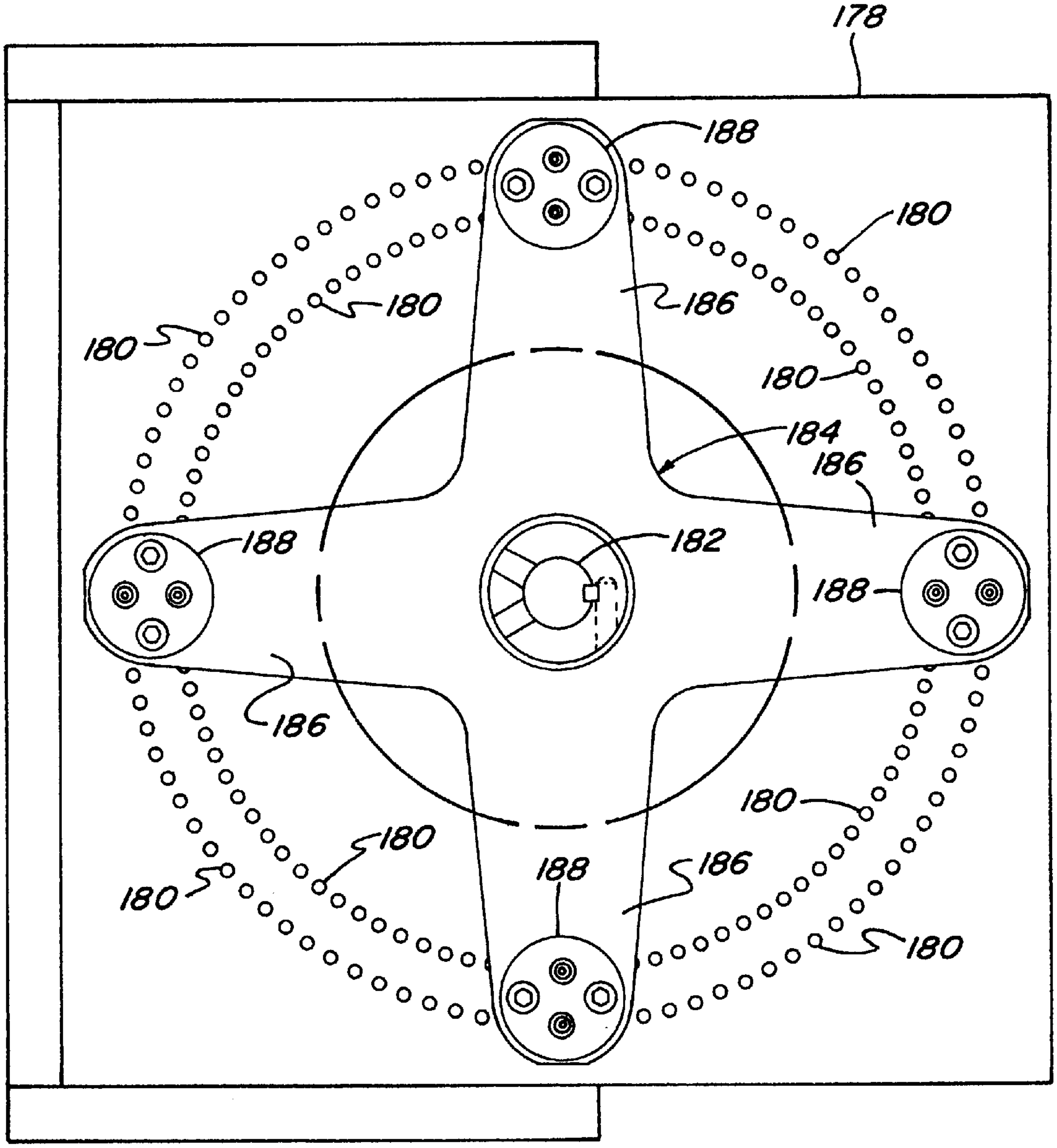
FIG. 14 is a top view of the distribution device of FIG. 13.

Referring now to FIG. 13, a side view of a distribution device 156, shown in partial cross-section, and a solenoid valve device 158 having a single inlet and eight outlets is shown. In the system embodied in FIGS. 12–15, single inlet—multiple outlet solenoid valve device 158 could include 8 individual solenoid operated air valves, or a single inlet—eight (8) outlet valve such as Matrics Model No. MX 758.802 xx 24. The exact valve or valves utilized is not critical to the present invention and it is understood that numerous existing controllable valves could be substituted in device 158. Further, each of the solenoid operated valves is preferably a three-way type valve in order to reduce forces caused by pressure build up. However, it is understood that two-way type valves could also be utilized. In either case, connectors 172 are provided to each of the eight outlets for connection to flexible air tubing, represented by dashed lines 166, which tubing runs to distribution device 156. Eight internal flow paths (not shown) from inlet connector 174 to respective outlet connectors 172 are controllable by way of the solenoid operated valve associated with each flow path. Each flow path is normally closed, with operation of the solenoid opening the flow path. Accordingly, opening and closing of the eight flow paths can be selectively controlled accordingly to electrical signals effected by the computer control system 152 (FIG. 12) via lines 168. The duration of the opening of such flow paths can also be controlled according to the duration of the electrical signals.

The distribution device 156 is also controlled by the computer control system 152 and includes a position controllable motor 176, such as a step motor or servo motor, which is connected to the computer control system for control thereby. Motor 176 is mounted to a distribution plate 178 which includes a plurality of distribution passages or ports 180 extending therethrough. As best seen in the top view of FIG. 14, the distribution ports 180 are arranged in two concentric circumferential patterns. A motor shaft 182 is connected to a structure 184 having four distribution arms 186 extending therefrom. Connection of structure 184 to motor shaft 182 may be achieved by way of any known means. Each distribution arm 186 extends over the region including the distribution ports 180 of plate 178, and can be controllably rotated relative to the distribution plate 178 by operation of motor 176. Each distribution arm 186 includes a housing member 188 mounted thereon in the region of overlap with the distribution ports 180 of plate 178.

Figure 15:
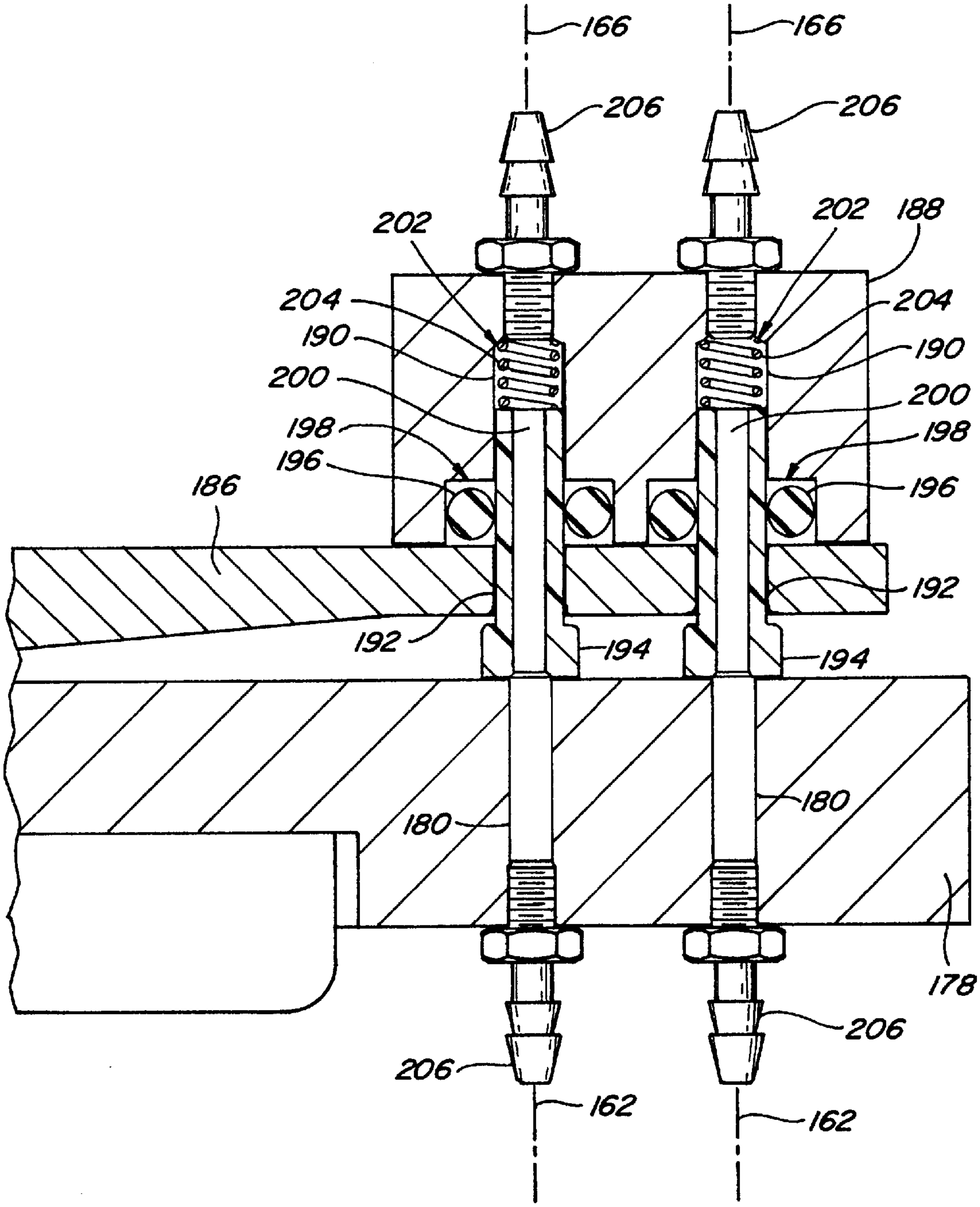
FIG. 15 is an enlarged partial cross-sectional view of one arm portion of the distribution device of FIG. 13.

As best seen with reference to FIG. 15, housing member 188 includes two passages 190 extending from top to bottom therethrough. The housing member 188 and passages 190 are positioned on arm 186 such that each passage 190 aligns with a respective passage 192 through the distribution arm 186. Positioned within each passage 190, and extending through each passage 192, is a sliding seal member 194 which may be formed of hard plastic. An o-ring seal 196 is positioned within an annular recess 198 provided in each passage 190 such that pressurized air provided to the top of each passage 190 is directed through a passage 200 in the respective sliding seal member 194 positioned therein. Each passage 190 also includes a stop surface 202 located between the top of the passage and the sliding seal member 194, a spring 204 or other resilient member being positioned in each passage 190 such that one end of the spring 204 abuts against the stop surface 202 and the other end thereof abuts against the sliding seal member 194. Each spring 204 therefore biases the respective sliding seal member 194 downward against the top surface of the distribution plate 178 such that, when aligned with a distribution port 180, an effective sealing arrangement is provided therebetween.

Coupling members 206 are also provided in the top of each passage 190 for coupling such passages 190 to the flexible tubing 166 coming from the solenoid valve device 158 (FIGS. 12–13). Similar coupling members 206 are provided at the bottom of each distribution port 180 for coupling such ports 180 to flexible tubing 162 which will extend to the air pilot operated reset or release valves associated with the flow sensor devices of the vacuum pick up and place device 154 (FIG. 12). Each reset valve and release valve associated with a flow sensor device of the vacuum pick up and place device 154 is therefore connected in flow communication with a predetermined distribution port 180.

The computer control system 152 of FIG. 12 includes stored information which is representative of which reset valves and which release valves of a vacuum pick up and place device 154 are connected to which distribution ports 180, including stored information representative of which distribution ports 180 are associated with distribution arms 186 for a particular position of motor 176. Such system 152 is generally programmed to recognize that at each motor position the air pilot operated reset valves or release valves associated with particular flow sensor devices of the vacuum pick up and place device 154 are connected through solenoid valve device 158 to the pressurized air source 160. Thus, by selectively controlling the solenoid air valves of device 158, the operation of particular reset valves or release valves associated with the flow sensor devices of vacuum pick up and place device 154 is controlled. As seen with reference to FIGS. 13 and 14, control of all of the reset valves or release valves can be achieved by utilizing motor 176 to control the circumferential movement of the distribution arms 186 through approximately 90 degrees. Of course, a system could include more or less than four distribution arms, in which case the required circumferential movement of such distribution arms would be less or more respectively. Similarly, more or less than two circumferential rings of distribution ports 180 could be provided in plate 178, requiring corresponding modification of distribution arms 186.

In a typical pick up and place operation, the computer control system 152 effects movement of the distribution arms 186 and operation of the solenoid valves of device 158 in order to operate the air pulse operated release valves necessary to release a product. Such product is released when the main passages of the flow sensor devices having vacuum cups associated with such product are shut-off by operation of the release valves. Thus, if a particular product is held by ten vacuum cups of the vacuum pick up and place device 154, the particular product can be released by operating the release valves of each flow sensor device connected in-line with the ten vacuum cups.

Similarly, if the main passages of ten flow sensor valves associated with ten respective vacuum cups are in shut off mode, and it is desirable to utilize such ten vacuum cups to pick up a product. After the ten vacuum cups have been pressed against the surface of the product which is to be picked up, momentary operation of the reset valves of the ten respective flow sensor devices results in opening of the main passages thereof such that the product can be held by the vacuum forces thereafter associated with the ten vacuum cups.

Figure 16:
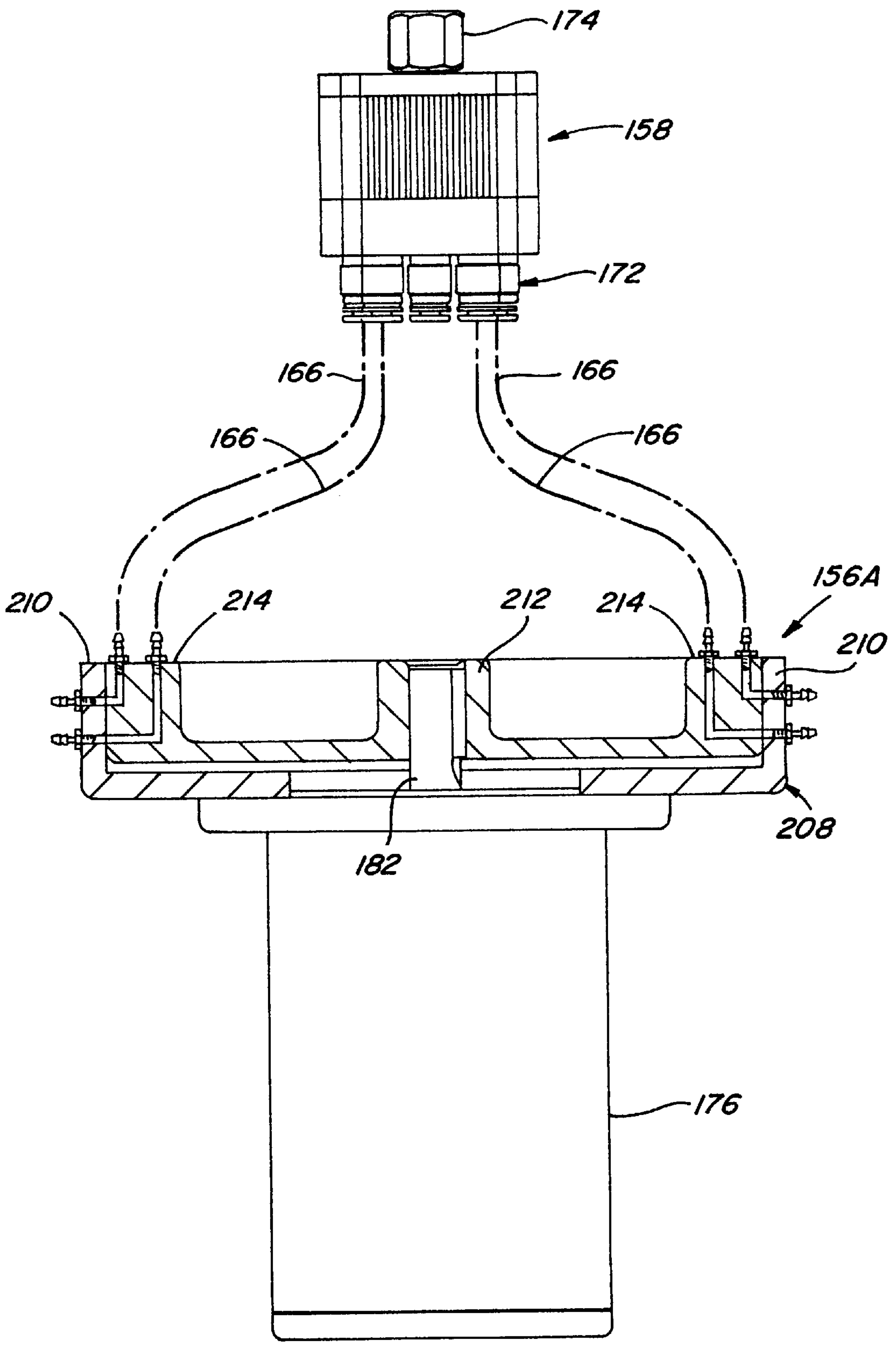
FIG. 16 is a partial cross-sectional view of another embodiment of a distribution device associated with a single inlet - multiple outlet solenoid operated valve device.
Figure 17:
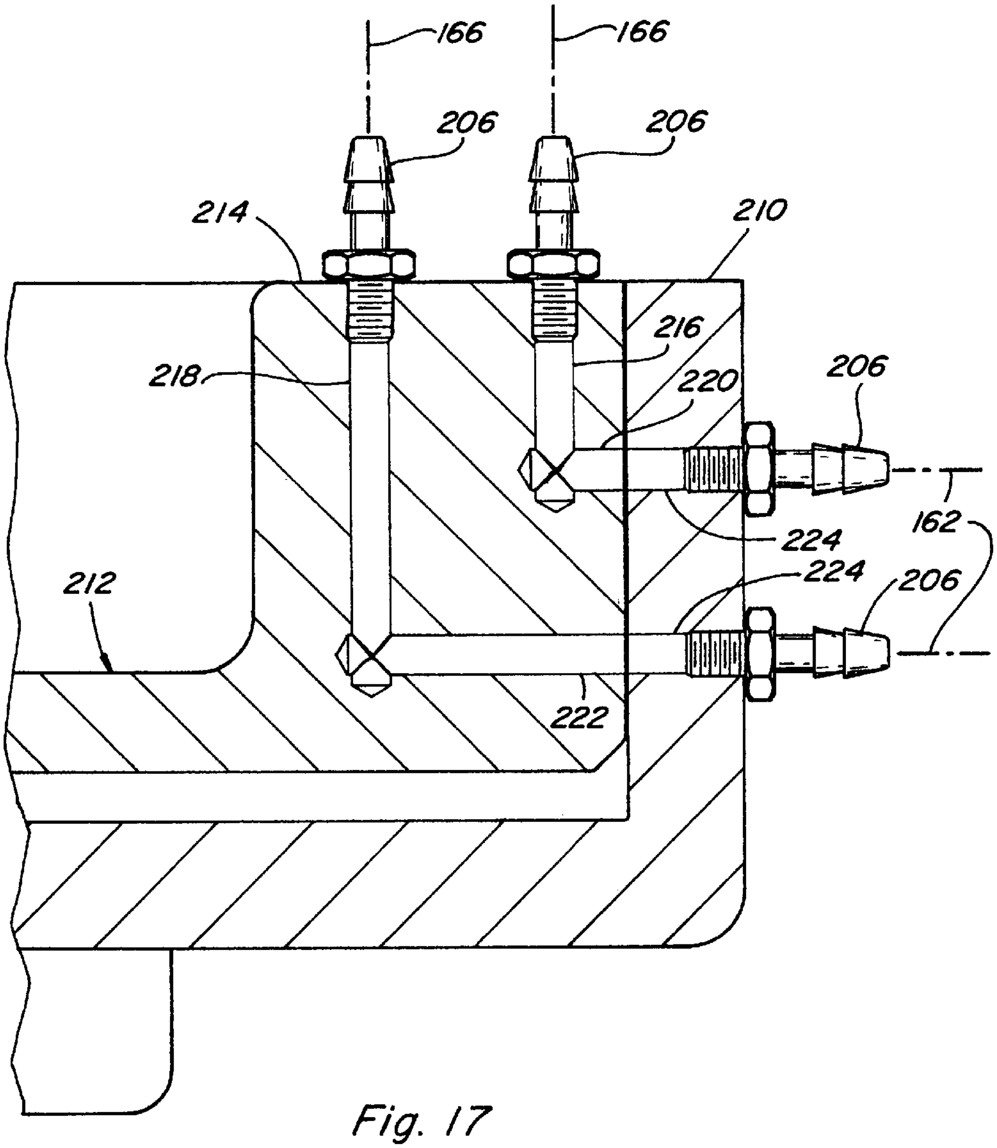
FIG. 17 is an enlarged partial cross-sectional view of one arm portion of the distribution device of FIG. 16.

An alternative embodiment of a distribution device 156A is illustrated in FIG. 16, such embodiment including a position controllable motor 176 mounted to a distribution member 208 which includes an annular wall 210. Mounted to a shaft 182 of motor 176 is a structure 212 including a radially outward annular portion 214. Referring more particularly to the enlarged view of FIG. 17, located at a plurality of circumferential positions around annular portion 214 are downward extending passages 216 and 218 which intersect radially extending passages 220 and 222 respectively. The annular wall 210 includes a plurality of circumferentially positioned distribution ports 224. Operation of the distribution device 156A is substantially as described above with respect to device 156, rotation of annular portion 214 relative to annular wall 210 controllably aligning the radial passages 220 and 222 with distribution ports 224 at various circumferential locations around annular wall 210. A very small clearance between the radially outer surface of annular portion 214 and the radially inner surface of annular wall 210 provides near sealing therebetween. Alternatively, sliding seals such as provided in distribution device 156 (FIG. 15) could also be incorporated in distribution device 156A.

Although two embodiments of a distribution device, 156 and 156A, have been illustrated above, it is understood that a variety of configurations for such a device are possible. For example, a linear arrangement of distribution ports in a distribution plate could be associated with one or more distribution arms which are moved linearly relative to the distribution ports by linear motor. Further, the number of distribution ports and distribution arms could be varied according to the configuration of the particular pick up and place device 154, as well as according to the number of outlets provided from the solenoid valve device 158. Further, although it has been indicated that each release valve and reset valve of a pick up and place device is independently controllable in the system 150 depicted in FIG. 12, it is understood that each outlet of solenoid valve device 158 could be connected to more than one location on the distribution device to provide zone control of reset valves and release valves of adjacent flow sensor devices.

Although repeated reference has been made herein to vacuum pick up and place systems, it is recognized that other applications for the flow sensor devices described herein are possible. For example, it is sometimes advantageous to hold parts by vacuum while machining or assembly operations are performed. Flexible or delicate parts are also held in this manner to prevent damage to the workpiece. The fixture can consist of numerous vacuum cups or simple ports in a grid array that will accept the largest workpiece. When holding smaller workpieces, the vacuum openings that will not be used have to be sealed off either by shut-off valves in the vacuum lines or by masking off the inactive cups. This takes time away from production whenever a workpiece changes size. By using flow sensor devices in accordance with the present invention, all changeover time between sizes is eliminated because the inactive vacuum cups will automatically close off.

Referring again to vacuum pick up and place applications, in material handling system involving palletizing cartons, pallet loads of case packages are typically built up layer by layer with adjacent layers oriented differently to mechanically interlock the boxes and make the pallet load more stable. Vacuum cups are used to pick up packages and place them on the pallet load by a palletizing machine. Package orientation can be determined by how they are accumulated for pickup, or by how packages are released from the vacuum pickup device. To accommodate a wide variety of package sizes and orientations, it is advantageous to use a large number of smaller diameter vacuum cups. In operation, a dense array of vacuum cups with flow sensor devices would be lowered onto the top pallet layer, placing the cups in contact with the packages. A vacuum source would then be applied to the entire array. The cups in sealing contact with a package would pass a relatively small airflow depending on porosity of the package material that would be less than the predetermined setpoint of the flow sensor valve so it would remain open. Those cups over cracks, cuts, edges, etc., that didn't maintain sealing contact would be open to atmosphere and would leak a larger flow rate of air and those exceeding the flow sensor valve setpoint would cause the valve to close. By closing off the inactive cups with a flow sensor device, more vacuum flow is available to the active cups which allows achieving a higher vacuum level to more securely hold the work load.

Homogeneous pallet loads are common and are relatively easy to build up in oriented layers. However, it is desirable to be able to build up mixed pallet loads at warehouse distribution facilities to fill customer order for less-than-full pallet loads, or even for less-than-full layer mixed pallet loads. To build pallets of mixed size packages, the orientation of each package must be controlled, which can be done by picking up one package at a time and placing it on the pallet load. This can dramatically slow the output from a warehouse and increase wear and maintenance of the palletizing machine due to the additional motions required. It is more productive to pick up several packages simultaneously and have the capability to individually release packages onto a pallet load. Unreleased packages would then be available for placing onto the next pallet that moves into position. To optimize this capability, it is necessary to have individual control, or at least zone control, of the vacuum cups so a particular package can be released, regardless of package size or orientation. This is accomplished via the release valve which causes the main passage to close whenever a remote control signal is received. The release valve functions by admitting enough bleed air flow to cause the sealing member of the main flow passage to close at its preset flow rate setpoint. Similarly, once packages have been selected and picked up for transfer, it is advantageous to be able to pick up additional packages while maintaining vacuum on the packages already held. The "reset" valve feature accomplishes this by reopening the main flow passage after the vacuum cup is in sealing contact with a package thereby allowing it to be picked up. The reset valve functions by creating a bypass flow path around the main flow passage sealing member and seat which allows the resilient member to return the sealing member to its open position once pressure equalizes.

From the preceding description of the illustrated embodiments, it is evident that the objects of the invention are attained. In particular, a valve construction for the main flow passage of a flow sensor device in which air flow which exceeds a predetermined amount results in shut off of the valve of the main flow passage with negligible leakage flow, and which can be adjusted or tuned such that the shut off point of the valve corresponds to various desired applications is provided. Further, a flow sensor device which includes a release valve which enables the main passage to be shut off even when the vacuum cup is in sealing contact with a work piece or product is provided, and a flow sensor device which includes a reset valve which enables a main flow passage which is in shut off mode to be opened without requiring the vacuum source associated therewith to be turned off is also provided. An air pulse distribution system is also provided, enabling control of the reset and/or release valves of the flow sensor devices. Although the invention has been described and illustrated in detail, it is to be clearly understood that the same is intended by way of illustration and example only and is not to be taken by way of limitation.

For example, while the release valves and reset valves described above are operated by a pressurized air source, it is contemplated that, in place of the piston members, solenoid members could be provided, such that control of the valves would be by way of electrical current. Further, although the sealing member herein has been depicted as being ball shaped, it is understood that other configurations for such member are possible. Accordingly, the spirit and scope of the invention are to be limited only by the terms of the appended claims.

What is claimed is:

1. A vacuum holding system including a source of vacuum pressure and a plurality of flow sensor devices, each flow sensor device having a connection to the vacuum pressure source and a connection to a plurality of suction cups associated therewith for holding respective articles, the vacuum cups being arranged in an array and having the source of vacuum pressure connected in flow communication therewith through the respective flow sensor device, the flow sensor devices being positioned intermediate the source of vacuum pressure and respective ones of the vacuum cups, each of the flow sensor devices comprising:

a body portion having a main air flow passage therethrough, the main air flow passage including an upstream end connected to the respective vacuum cups and a downstream end connected to the source of vacuum pressure;

a seating structure positioned within the main air flow passage including a seat portion located in communication with the downstream end thereof;

a centering structure positioned within the main air flow passage upstream of the seating structure;

a sealing member positioned within the main air flow passage between the seat portion of seating structure and the centering structure;

a resilient member positioned within the main air flow passage between the sealing member and the seating structure, a portion of the resilient member contacting the sealing member and urging the sealing member into spaced relation to the set portion of the seating structure;

each flow sensor device further comprising means for adjusting the closing flow set point to establish a desired flow cut off point including means for adjusting the positioned of the seating structure in the air flow passage and the distance between the seating structure and the centering structure to correspondingly adjust the rate of air flow through the main passage which will cause the sealing member to contact the seat portion of the seating structure so that;

when leakage occurs between one of the suction cups and the article engaged thereby it will cause upstream to downstream air flow through the main flow passage to exert force on the sealing member to move the sealing member in a direction which opposes the urging of the resilient member and if a sufficient rate of air flow occurs through the main air flow passage the force exerted on the sealing member by the air flow will overcome the force of the resilient member and cause the sealing member to contact the seat portion of the seating structure in a sealing relationship such that air flow through the main air flow passage is substantially eliminated.

2. The vacuum holding system of claim 1 wherein at least a portion of the main air flow passage through each flow sensor device is threaded, the seating structure in each flow sensor device being threaded within the main air flow passage.

3. The vacuum holding system of claim 1 wherein at least a portion of the main air flow passage in each flow sensor device is threaded, the centering structure being threaded within the main air flow passage.

4. The vacuum holding system of claim 1 wherein the seating structure in each flow sensor device is positioned a predetermined distance from the centering structure, each flow sensor device further comprising means for adjusting the distance between the seating structure and the centering structure, adjustment of such distance correspondingly adjusting the rate of air flow through the main passage which will cause the sealing member to contact the seat portion of the seating structure.

5. The vacuum holding system of claim 1 wherein the resilient member in each flow sensor device is a spring, one end of the spring contacting a portion of the seating structure, the other end of the spring contacting the sealing member.

6. The vacuum holding system of claim 1 wherein the sealing member in each flow sensor device is ball shaped and the seat portion of the seating structure is a frustoconical surface.

7. The vacuum holding system of claim 1 wherein the body portion of each flow sensor device further includes a controllable release valve having a normally-closed release flow path extending from ambient air to the main air flow passage at the upstream end of the sealing member.

8. The vacuum holding system of claim 7 wherein the controllable release valve in each flow sensor device includes a sealing member and seat located along the release flow path, the release valve sealing member being normally biased against the seat by a resilient member.

9. The vacuum holding system of claim 8 wherein the release valve in each flow sensor device includes a piston member which is operable to move the release valve sealing member out of sealing contact with the release valve seat in response to a burst of pressurized air.

10. The vacuum holding system of claim 1 wherein the body portion of each flow sensor device further includes a controllable reset valve having a normally-closed bypass flow path extending from the main air flow passage at the upstream side of the sealing member to the main air flow passage at the downstream side of the seat portion of the seating structure.

11. The vacuum holding system of claim 10 wherein each controllable reset valve includes a sealing member and seat located along the bypass flow path, the reset valve sealing member being normally biased against the seat by a resilient member.

12. The vacuum holding system of claim 11 wherein each controllable reset valve includes a piston member which is operable to move the reset valve sealing member out of sealing contact with the reset valve seating in response to a burst of pressurized air.

13. The vacuum holding system of claim 11 wherein each controllable reset valve includes a solenoid which is operable to move the reset valve seating element out of sealing contact with the reset valve seat in response to an electrical signal provided thereto.

* * * * *

UNITED STATES PATENT AND TRADEMARK OFFICE
CERTIFICATE OF CORRECTION

PATENT NO. : 5,960,821
DATED : October 5, 1999
INVENTOR(S) : Edwin Lee Johnson

It is certified that error appears in the above-identified patent and that said Letters Patent is hereby corrected as shown below:

Column 4, line 8, insert --.-- after "off".

Column 5, line 37, "alien" should be --allen--.

Column 9, line 31, insert --.-- after "thereof".

Signed and Sealed this

Sixth Day of June, 2000

*Attest:*

Q. TODD DICKINSON

*Attesting Officer*

*Director of Patents and Trademarks*